United States Patent
Huang et al.

(10) Patent No.: US 8,480,187 B2
(45) Date of Patent: Jul. 9, 2013

(54) DOOR OPENER AND ELECTRONIC DEVICE ENCLOSURE USING SAME

(75) Inventors: Ri-Dong Huang, Shenzhen (CN); Hsuan-Tsung Chen, Tu-Cheng (TW); Guang-Yao Lee, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 342 days.

(21) Appl. No.: 13/070,452

(22) Filed: Mar. 23, 2011

(65) Prior Publication Data
US 2012/0139401 A1 Jun. 7, 2012

(30) Foreign Application Priority Data
Dec. 3, 2010 (CN) .......................... 2010 1 0572433

(51) Int. Cl.
*A47B 97/00* (2006.01)
(52) U.S. Cl.
USPC ........................ 312/223.2; 312/319.2; 49/386
(58) Field of Classification Search
USPC ............. 312/223.1, 223.2, 319.1, 319.2, 326, 312/327, 328, 292; 49/386, 323; 361/679.02, 361/679.33
See application file for complete search history.

(56) References Cited

U.S. PATENT DOCUMENTS

| | | | | |
|---|---|---|---|---|
| 6,411,583 B1 * | 6/2002 | Yamamoto et al. | ........... | 720/647 |
| 6,834,919 B1 * | 12/2004 | Mariano | ..................... | 312/223.2 |
| 7,510,250 B2 * | 3/2009 | Lin et al. | ..................... | 312/223.2 |
| 7,679,897 B2 * | 3/2010 | Xu et al. | .................. | 361/679.37 |
| 7,722,136 B2 * | 5/2010 | Chen et al. | .................. | 312/223.2 |
| 8,348,358 B2 * | 1/2013 | Huang et al. | ............... | 312/223.2 |

* cited by examiner

*Primary Examiner* — James O Hansen
(74) *Attorney, Agent, or Firm* — Altis Law Group, Inc.

(57) ABSTRACT

A door opener includes a main bracket, a locking element, a compression spring, a rotation plate, and a torsion spring. The main bracket includes a lower plate and a first sidewall and a second sidewall oppositely positioned at edges of the lower plate. A guide rail and a resisting portion extend from the first sidewall opposite to the second sidewall. The first sidewall defines a through hole thereon. The locking element includes a sliding bar and a spacing block extending from a side of the sliding bar, the sliding bar supported on the guide rail, and the spacing block passing through the through hole. The compression spring is sleeved on the guide pole. The rotation plate is rotatably received in the main bracket, and a fixing block for latching with the spacing block extends from the rotation plate. The torsion spring resists the rotation plate and the lower plate.

10 Claims, 4 Drawing Sheets

US 8,480,187 B2

DOOR OPENER AND ELECTRONIC DEVICE ENCLOSURE USING SAME

BACKGROUND

1. Technical Field

The present disclosure relates to a door opener for opening a door of an electronic device enclosure.

2. Description of Related Art

Computer hosts can include a cabinet, a CD drive, and an access door. The cabinet defines an access opening therein. The CD drive is received in the cabinet and can be accessed through the access opening. The access door is hinged on the cabinet and configured for opening and closing the access opening. The access door includes a grab. The cabinet defines a notch around the access opening and corresponding to the grab. After the access door is closed, the grab is received in the notch and latches the access door to the cabinet. To access the CD drive, is manually separated and then the access door rotated, which is inconvenient.

Therefore, it is desirable to provide a door opener which can overcome the limitations described.

DETAILED DESCRIPTION

Embodiments of the disclosure will now be described in detail, with reference to the accompanying drawings.

Figure 1:
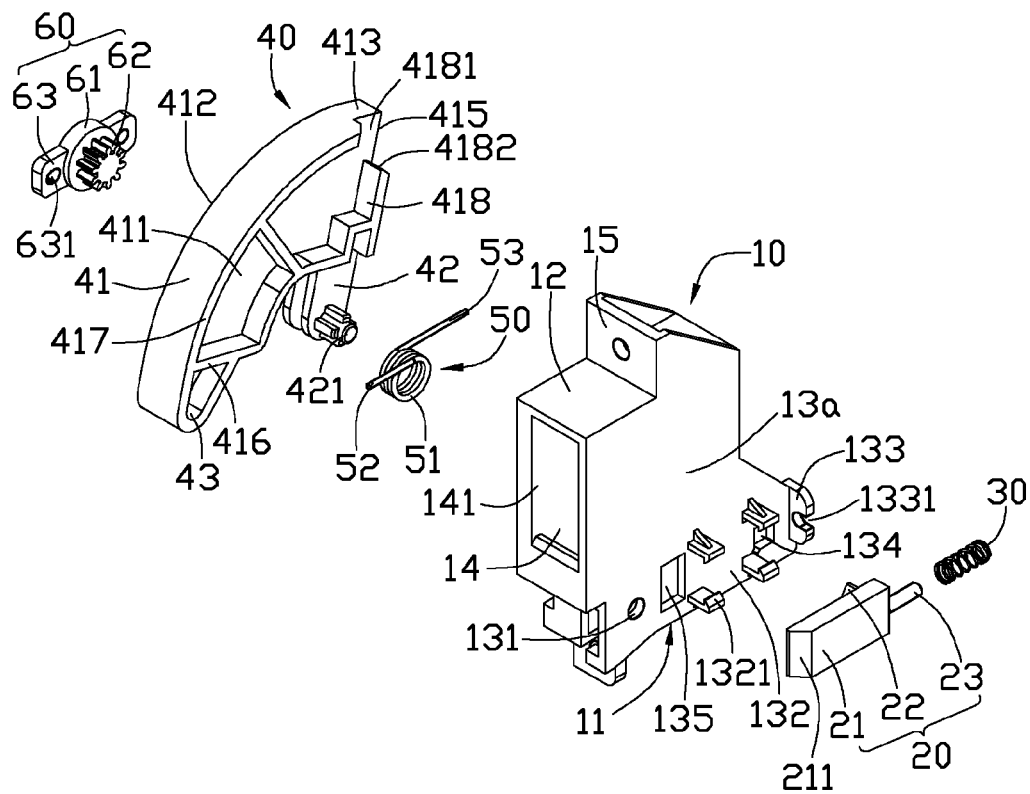
FIG. 1 is an isometric, exploded, and schematic view of a door opener in accordance with an exemplary embodiment.
Figure 2:
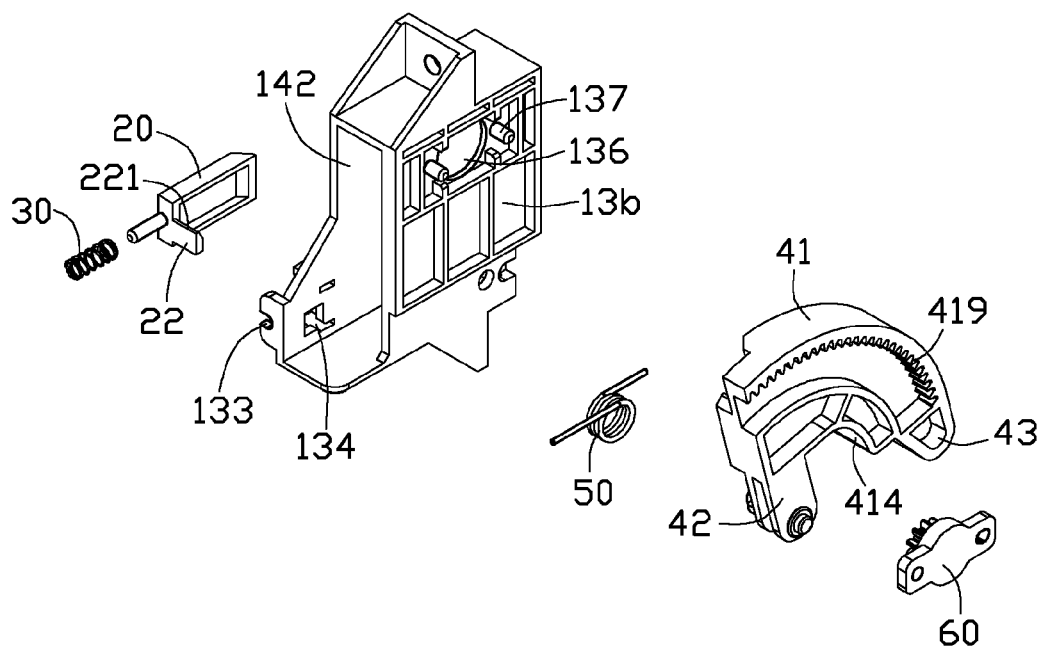
FIG. 2 is similar to FIG. 1, but viewed from another angle.
Figure 3:
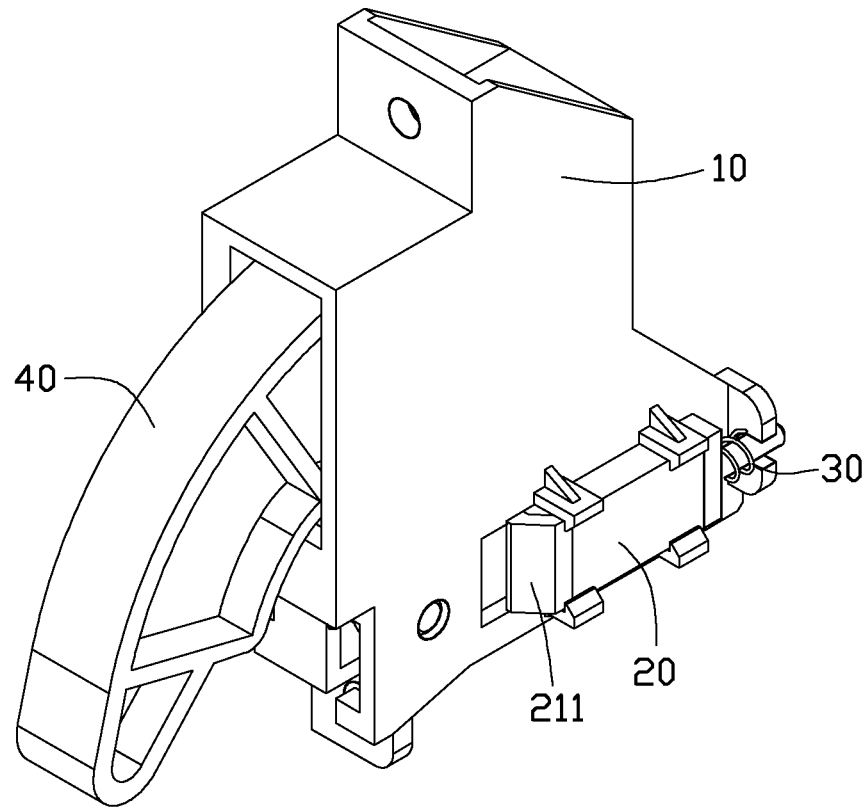
FIG. 3 is an assembled view of the door opener of FIG. 1.
Figure 4:
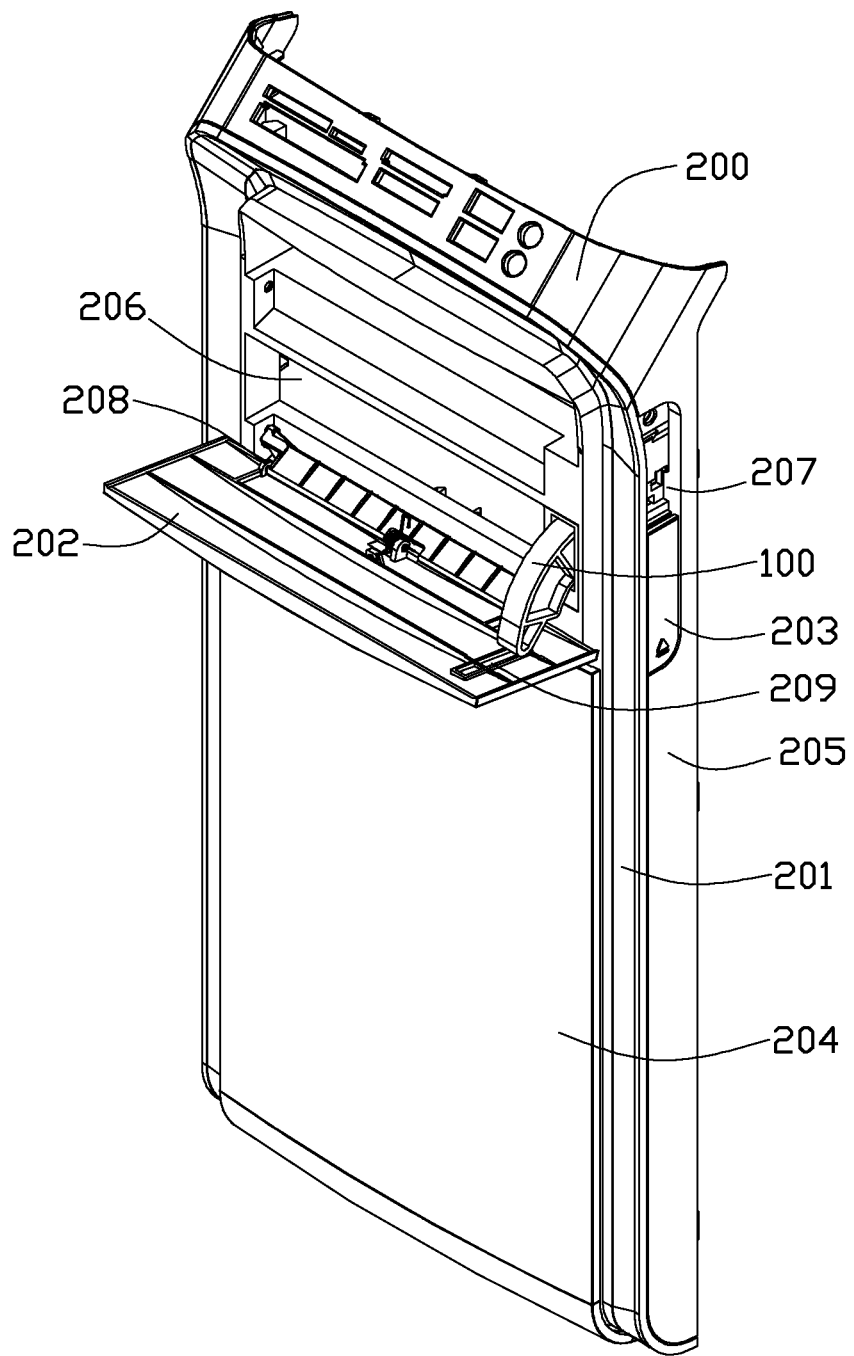
FIG. 4 is an assembled view of an electronic device enclosure using the door opener of FIG. 1.

Referring to FIGS. 1-3, a door opener 100 according to an exemplary embodiment, for automatically opening a door 202 (as shown in FIG. 4), includes a main bracket 10, a locking element 20, a compression spring 30, a rotation plate 40, a torsion spring 50, and a damping gear 60.

The main bracket 10 is a hollow rectangular configuration, and includes an upper plate 11, a lower plate 12, a first sidewall 13a, and a second sidewall 13b. The upper plate 11 and the lower plate 12 respectively have two opposite edges, from which the first sidewall 13a and the second sidewall 13b extend to cooperatively define a cavity 14 therebetween. The cavity 14 includes an outlet 141 and an inlet 142 opposite to the outlet 141. Two fixing portions 15 respectively extend upwards from the upper plate 11 and the lower plate 12. The first sidewall 13a and the second sidewall 13b respectively define a pair of shaft holes 131 therethrough, adjacent to the lower plate 12 and the outlet 141. The first sidewall 13a defines a guide rail 132 on a surface opposite to the second sidewall 13b, adjacent to the lower plate 12. The guide rail 132 has a guiding direction which is substantially parallel to the lower plate 12. The shaft holes 131 are aligned with each other and extending substantially perpendicular to the guiding direction. The guide rail 132 includes four guide portions 1321 in two rows along a longitudinal axis thereof. Each guiding portion 1321 is L-shaped. A resisting portion 133 extends upwards from the first sidewall 13a opposite to the second sidewall 13b. The resisting portion 133 is positioned at an edge of the first sidewall 13a and faces the guide rail 132. The resisting portion 133 defines an opening 1331 thereon. The first sidewall 13a defines a through hole 134 between the guide rail 132 and the resisting portion 133 and a receiving hole 135 on the guide rail 132. The second sidewall 13b defines a fixing hole 136 communicating with the cavity 14. Two position poles 137 extend upwards from the second sidewall 13b and around the fixing hole 136.

The locking element 20 includes a sliding bar 21, a spacing block 22, and a guide pole 23. The sliding bar 21 is assembled on the guide rail 132 and moves along the guide rail 132. The spacing block 22 extends from the sliding bar 21 substantially perpendicular to the guiding direction and received in the through hole 134. The guide pole 23 extends from one end of the sliding bar 21 along the guiding direction and is received in the opening 1331. The sliding bar 21 defines a first bevel 211 at one end facing away from the guide pole 22. The first bevel 211 faces away from the spacing block 22. The spacing block 22 defines a second bevel 221 at one side adjacent to the upper plate 11. The second bevel 221 faces away from the guide pole 23.

The rotation plate 40 is received in the cavity 14, and includes a main body 41, a connection portion 42, and an operating portion 43. The main body 41 is semi-hemispherical, and includes a left surface 411, a right surface 412, an outer surface 413, and an inner surface 414 interconnected to the left surface 411 and the right surface 412. Two ends of the main body 41 respectively define a spacing end 415 and a connection end 416. Two shielding plates 417 respectively extend from the outer surface 413 and the inner surface 414, perpendicular to the left surface 411 and the right surface 412. A fixing block 418 extends from the left surface 411, along an edge of the spacing end 415. The fixing block 418, together with the shielding plate 417, forms a gap 4181 adjacent to the outer surface 413. The fixing block 418 defines a third bevel 4182 at one end facing the outer surface 413. The third bevel 4182 faces the spacing end 415. The shielding plate 417 extending from the right surface 412 and adjacent to the outer surface 413 defines a toothed portion 419 facing the inner surface 414.

The connection portion 42 is positioned on the inner surface 414 of the main body 41, adjacent to the spacing end 415. A pair of shafts 421 extends from two sides of the connection portion 42. The longitudinal axis of the shafts 421 is perpendicular to the left surface 411 and the right surface 412 of the main body 41. The operating portion 43 is triangular and positioned on the connection end 416 of the main body 41.

The torsion spring 50 includes a ring portion 51, a first fixing terminal 52, and a second fixing terminal 53. The first fixing terminal 52 and the second fixing terminal 53 respectively extend from two opposite ends of the ring portion 51.

The damping gear 60 includes a round plate 61, a gear portion 62 extending from an end surface of the round plate 61, and two fixing portions 63 appositively extending from a side surface of the round plate 61. Each of the fixing portions 63 defines a position hole 631 thereon.

In assembly, the compression spring 30 is sleeved on the guide pole 23 of the locking element 20. The locking element 20 is assembled on the first sidewall 13a with the sliding bar 21 movably positioned on the guide rail 132, the spacing block 22 penetrating the through hole 134, and the guide pole 23 received in the opening 1331. The first bevel 211 of the sliding bar 21 is formed opposite to the receiving hole 135. The compression spring 30 is compressed between the resisting portion 133 and the sliding bar 21. The rotation plate 40 is received in the cavity 14 from the inlet 142 by the shafts 421 being received in the shaft hole 131. The left surface 411 of the main body 41 faces the first sidewall 13a. The operating portion 43 is exposed through the outlet 141. The fixing block 418 is latched with the spacing block 22. The ring portion 51 of the torsion spring 50 is sleeved on the shaft 421 of the rotation plate 40, with the first fixing terminal 52 fixing at the lower plate 12 and the second fixing terminal 53 fixing at the shielding plate 417. The damping gear 60 is positioned on the second sidewall 13b by the gear portion 62 being received in the cavity 14 through the fixing hole 136. The position hole 631 of each fixing portion 63 is sleeved on a corresponding one of the position poles 137. The gear portion 62 meshes with the toothed portion 419 of the rotation plate 40.

Referring to FIG. 4, the door opener 100 is assembled on an electronic device enclosure 200. The electronic device 200 includes a cabinet 201, a door 202, and a button 203. The cabinet 201 includes a front panel 204 and a side panel 205 connecting to the front panel 204. The cabinet 201 defines an access opening 206 on the front panel 204 and a button hole 207 on the side panel 205. The door 202 is attached to the front panel 204 by a hinge 208, defines a sliding groove 209 on an inner side thereof. The button 203 is assembled in the button hole 207.

The door opener 100 is received in the cabinet 201, aligned to the side panel 205. The outlet 141 of the main bracket 10 penetrates from the access opening 206. One end of the operating portion 43 is movably received in the sliding groove 209. One end of the button 203 resists the first bevel 211 of the sliding bar 21. When the door 202 is closed, the torsion spring 50 is compressed and the spacing end 415 contacts the lower plate 11. After the door 202 is opened, the torsion spring 50 relaxes and the spacing end 415 separates from the lower plate 11.

During opening, the button 203 is pressed, and the locking element 20 is compressed to slide on the guide rail 132. The sliding bar 21 moves between the receiving hole 135 and the resisting portion 133. When the sliding bar 21 approaches the resisting portion 133, the spacing block 22 separates the fixing block 418 from the gap 4181, the rotation plate 40 is rotated under the restoring force of the torsion spring 50. The locking element 20 is restored by the restoring force of the compression spring 30. As the rotation plate 40 rotates from the outlet 141 in a first position, the door 202 is opened.

During closing, the door 202, when closed, drives rotation plate 40 to be received in the cavity 14 in a second position. When the third bevel 4182 of the fixing block 418 contacts the second bevel 221 of the sliding bar 21, the locking element 20 is compressed to slide on the guide rail 132. When the sliding bar 21 approaches the resisting portion 133, the spacing block 22 latches with the fixing block 418 in the gap 4181. The locking element 20 is restored by the restoring force of the compression spring 30 and the rotation plate 40 is latched by the spacing block 22. The door 202 closes the access opening 206, and the torsion spring 50 is again compressed between the lower plate 12 and the shielding plate 417.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A door opener for opening a door of an electronic device, the door opener comprising:
    a main bracket comprising a lower plate, a first sidewall, a second sidewall, a guide rail, and a resisting portion, the lower plate having two opposite edges, the first sidewall and the second sidewall extending from the opposite edges of the lower plate respectively, the first sidewall and the second sidewall defining a pair of shaft holes therethrough, the guide rail and the resisting portion being located on a surface of the first sidewall and facing away the second sidewall, the guide rail having a guiding direction which is substantially parallel to the lower plate, the shaft holes being aligned with each other and extending substantially perpendicular to the guiding direction, the first sidewall defining a through hole on the guide rail, the resisting portion defining an opening thereon;
    a locking element comprising a sliding bar, a spacing block, and a guide pole, the sliding bar being capable of sliding along the guiding direction, the spacing block extending from the sliding bar and passing through the through hole, the spacing block being substantially perpendicular to the guiding direction, the guide pole extending from one end of the sliding bar along the guiding direction and being received in the opening;
    a compression spring sleeved on the guide pole and compressed between the sliding bar and the resisting portion;
    a rotation plate located between the first sidewall and the second sidewall and comprising a pair of shafts and a fixing block, the shafts extending from two side surfaces of the rotation plate and received in the shaft holes, the fixing block extending from one side of the rotation plate and configured for latching with the spacing block; and
    a torsion spring sleeved on one of the shafts and resisted between the rotation plate and the lower plate, the rotation plate being capable of selectively rotating to one of a first position in which the door is opened, the torsion spring relaxes and the fixing block separates from the spacing block, and a second position in which the door is closed, the torsion spring is at a twisted state and the fixing block latches with the spacing block.

2. The door opener of claim 1, wherein the main bracket further comprises an upper plate, the first sidewall and the second sidewalls oppositely interconnect between the upper plate and the lower plate and defines a cavity therebetween, the cavity comprises an outlet and an inlet opposite to the outlet, the rotation plate is received in the cavity and capable of being exposed through the outlet.

3. The door opener of claim 2, wherein the shaft holes are adjacent to the lower plate and the outlet; the rotation plate comprises a connection portion, and the shafts extends from two sides of the connection portion.

4. The door opener claim 3, wherein the rotation plate further comprises a main body and an operating portion, the main body is semi-hemispherical shaped, and comprises a left surface, a right surface, an outer surface and an inner surface, each of the outer surface and the inner surface is interconnected to the left surface and the right surface; two ends of the main body respectively define a spacing end and a connection end; the operating portion is positioned on the connection end, the connection portion is positioned on the inner surface.

5. The door opener of claim 4, wherein the rotation plate comprises two shielding plates, one of the shielding plates extends from the outer surface, another of the shielding plates extends from the inner surface, the two shielding plates is perpendicular to the left surface and the right surface, the rotation plate defines a gap between the fixing block and the shielding plate that extends from the outer surface, the gap is adjacent to the outer surface, the spacing block is capable of separating from the fixing block through the gap.

6. The door opener of claim 4, wherein the sliding bar defines a first bevel at one end facing away from the guide pole.

7. The door opener of claim 4, wherein the spacing block defines a second bevel at one side adjacent to the upper plate, the fixing block defines a third bevel facing the outer surface.

8. The door opener of claim 4, wherein the shielding plate extending from the outer surface defines a toothed portion facing the inner surface; the door opener comprises a damping gear, the damping gear comprises a round plate and a gear portion extending from an end surface of the round plate, the damping gear is positioned on the second sidewall, and the gear portion meshes with the toothed portion.

9. The door opener of claim 1, wherein the torsion spring comprises a ring portion, a first fixing terminal, and a second fixing terminal; the ring portion is sleeved on the shaft with the first fixing terminal fixing at the lower plate and the second fixing terminal fixing at the shielding plate extending from the inner surface.

10. An electronic device enclosure comprising:
- a cabinet comprising a front panel and a side plate connecting to the front panel, the front panel defining an access opening, the side plate defining a button hole;
- a door rotatably assembled to the front panel and configured for opening and closing the access opening;
- a door opener received in the cabinet comprising:
  - a main bracket comprising a lower plate, a first sidewall, a second sidewall, a guide rail, and a resisting portion, the lower plate having two opposite edges, the first sidewall and the second sidewall extending from the opposite edges of the lower plate, the first sidewall and the second sidewall defining a pair of shaft holes therethrough, the guide rail and the resisting portion being located on a surface of the first sidewall and facing away the second sidewall, the guide rail having a guiding direction which is substantially parallel to the lower plate, the shaft holes being aligned with each other and extending substantially perpendicular to the guiding direction, the first sidewall defining a through hole on the guide rail, the resisting portion defining an opening thereon;
  - a locking element comprising a sliding bar, a spacing block, and a guide pole, the sliding bar being positioned on the guide rail and capable of sliding along the guiding direction, the spacing block positioned on the sliding bar and perpendicular to the guiding direction, the guide pole extending from one end of the sliding bar along the guiding direction, the spacing block penetrating through the through hole, the guide pole being received in the opening;
  - a compression spring being sleeved on the guide pole and resisting between the sliding bar and the resisting portion;
  - a rotation plate located between the first sidewall and the second sidewall and comprising a pair of shafts and a fixing block, the shafts extending from two side surfaces of the rotation plate and received in the shaft holes, the fixing block extending from one side of the rotation plate and configured for latching with the spacing block; and
  - a torsion spring sleeved on one of the shafts and resisted between the rotation plate and the lower plate, the rotation plate being capable of selectively rotating to one of a first position in which the door is opened, the torsion spring relaxes and the fixing block separates from the spacing block, and a second position in which the door is closed, the torsion spring is at a twisted state and the fixing block latches with the spacing block; and
- a button assembled in the button hole, one end of the button contacting with one end of the sliding bar facing away the guide pole.

* * * * *